United States Patent [19]

Papayoanou

[11] 4,091,133

[45] May 23, 1978

[54] POROUS CERAMIC TUBING FOR FLOWING GAS LASERS

[75] Inventor: Aristotle Papayoanou, Eatontown, N.J.

[73] Assignee: The United States of America as represented by the Secretary of the Army, Washington, D.C.

[21] Appl. No.: 637,246

[22] Filed: Dec. 3, 1975

[51] Int. Cl.$^2$ ............................................. F16L 9/08
[52] U.S. Cl. ........................................ 428/36; 138/177; 313/231.4; 331/94.5 D
[58] Field of Search ............... 428/36, 35; 331/4.5 D, 331/94.5 G, 94.5 T; 138/177; 313/231.3, 231.4, 221

[56] References Cited

U.S. PATENT DOCUMENTS

| | | | |
|---|---|---|---|
| 2,149,133 | 2/1939 | Cohn | 428/36 |
| 3,275,358 | 9/1966 | Shonebarger | 428/36 |
| 3,753,144 | 8/1973 | Kearns | 331/94.5 |
| 3,830,173 | 8/1974 | Hubble | 428/36 |

OTHER PUBLICATIONS

"Porous Ceramics," Kirk–Othmer, *Encycl. of Chem. Tech.*, vol. 4, Second Ed., pp. 838–839, 791–795.

*Primary Examiner*—Ellis Robinson
*Attorney, Agent, or Firm*—Nathan Edelberg; Jeremiah G. Murray; Roy E. Gordon

[57] ABSTRACT

Porous ceramic materials are used for the walls of tubing for flowing gas lasers. Analysis of the gas flow shows that the axial pressure variation in the porous wall tubes is more gradual than for dense wall tubes leading to more uniform gain conditions. The saturation intensity is more uniform not only due to the reduced pressure anisotropy but also, at higher flow rates, because of axially varying particle dwell times in the discharge region.

5 Claims, No Drawings

POROUS CERAMIC TUBING FOR FLOWING GAS LASERS

The invention described herein may be manufactured, used and licensed by or for the Government for governmental purposes without the payment to me of any royalty thereon.

BACKGROUND OF THE INVENTION

This invention relates in general to tubing for flowing gas lasers and in particular, to the use of porous ceramic materials for the walls of the tubing.

Waveguide capillary lasers exhibit high optical gains and saturation intensities for certain flowing gas systems, as for example, flowing gas $CO_2$ systems. However, axial flow systems give rise to a linearly varying pressure distribution which causes highly variable gains and saturation intensities along the tube axis. For narrow bore tubes which are made of dense ceramic materials, fast flow or long capillaries, this axial pressure differential becomes large thereby limiting the optimum pressure, for gain, to a relatively short length of the tube axis. This establishes realistic limits in scaling such amplifier tubes to long lengths.

SUMMARY OF THE INVENTION

The general object of this invention is to provide suitable tubing for flowing gas lasers. A particular object of the invention is to provide such tubing that will sustain optimum pressure along the entire tube axis. Another object of the invention is to provide such tubing that will allow flowing gas lasers to be scaled to much longer lengths than flowing gas lasers in which there is a longitudinal pressure gradient. A further object of the invention is to reduce the cost of presently used tubing made of dense ceramic materials.

According to the invention, the foregoing objects are attained by making the walls of the tubing for the flowing gas lasers of a porous ceramic material.

Most ceramic materials such as beryllia and alumina can be made porous by a plasma arc spraying process or an extrusion process generally involving the mixing of a ceramic powder such as beryllia or alumina with a chemical filler to obtain a dense slurry. The slurry is then flowed into a mold, and fired. The firing burns away the chemical filler leaving the porous ceramic materials. These porous ceramic materials are commercially available from various manufacturers including National Beryllia of Haskell, N.J., Coors Porcelain of Golden, Colo., and Brush Beryllium of Detroit, Mich.

Preferred for use as the porous ceramic material is a porous ceramic having an average pore size of about 2 to 20 microns. Particularly preferred is the use of beryllia or alumina. The pore size of the porous ceramic material is not critical. All that is required is that the porosity be sufficient to achieve the desired gas flow.

The use of the porous ceramic material for the walls of the tubing is particularly applicable to flowing gas lasers using narrow bore (1 to 2.5 millimeter) discharge tubes. Typically, the gas flow in such tubes is axial. In narrow bore tubes, the resulting gas flow or "Poiseuille flow" can only be sustained by a relatively large pressure gradient in the tube. Consequently, the gas pressure varies linearly along the tube axis and optimum pressure as for laser gain can be maintained only over a limited length along the tube axis. However, the use of the porous ceramic material for the walls of the tubing allows one to introduce the gas by leaking it in uniformly along the tube axis thereby eliminating the pressure gradient and allowing optimum gas pressure conditions to be sustained along the entire discharge length.

DESCRIPTION OF THE PREFERRED EMBODIMENT

1 Millimeter bore tubing is used as the discharge tube. The walls of the tubing are made of porous beryllia having an average pore size of 2 to 10 microns. When a gas mixture of carbon dioxide, nitrogen and helium is introduced into the tube from a high pressure chamber surrounding the tube, for the wall temperatures used, $20°\,C \pm 10°\,C$, the maximum gain measured, 25dB/meter exceeds the highest gain by at least 30 percent that can be obtained for carbon dioxide discharges through dense ceramic walled tubing.

In lieu of the gaseous mixture in the above embodiment, one might use other gaseous mixtures in which laser action is enhanced by flow.

Moreover, the cost of fabrication of the porous ceramics is much less than dense ceramics. That is, porous walled beryllium oxide tubing, prepared by an extrusion process can produce adequate quality tubing of straight and smooth bore in large batches at least ten times cheaper than dense isostatically pressed tubing.

Then too, porous wall, narrow bore flowing gas lasers can be scaled to much longer lengths than can flowing gas lasers in which there is a longitudinal pressure gradient. In the latter case, optimum gain and saturation intensities can be maintained only over a limited length along the discharge axis. Thus the gain per unit length decreases with increasing tube length while the saturation intensity (which is proportional to the pressure squared) varies greatly along the tube axis. For porous walled tubing, optimum pressure can be more nearly sustained along the entire tube axis and limitations in length scaling are imposed by the ability to maintain a discharge in the long narrow bore. When used as a laser amplifier, such porous walled discharge tubes would have the ordinary length limitation imposed by the finite saturation intensity although this latter parameter could be optimized by fast flow. For amplifying a weak signal, as in a receiving system, this limitation is unimportant. It is expected that tube fabrication can be simplified and gas flow increased when larger bore, that is 1.5 to 3 mm tubing is used.

The use of porous ceramic insulators and low optical losses can be used for transverse flow lasers where the gas flow and discharge are perpendicular. Such would be the case for a channel laser in which the side walls of the discharge tube or chamber are made of a porous ceramic material. Such a discharge tube is then completed with a metallic bottom wall as one electrode and a metallic top wall as the other electrode. In such a case, the gas could be leaked through one porous wall and pulled through the discharge region and the other porous wall by a pump.

The use of porous ceramic for the tube side walls in the channel configuration allows one to minimize any possible optical losses which may result by introducing the gas through many small holes drilled in the side walls of a dense ceramic. In addition, fabrication costs of porous lasers should be cheaper since material costs are less and labor costs of drilling small holes through dense ceramic are eliminated.

I wish it to be understood that I do not desire to be limited to the exact details of construction shown and described, for obvious modifications will occur to a person skilled in the art.

What is claimed is:

1. In a discharge tube for flowing gas lasers, the improvement of using porous ceramic material as the walls of the tubing, wherein the porous ceramic material has an average pore size of about 2 to 20 microns, and wherein the bore of the tubing is about 1 to 3 millimeters in diameter.

2. In a discharge tube according to claim 1, the use of a material selected from the group consisting of porous beryllia and porous alumina as the porous ceramic material.

3. In a discharge tube according to claim 2, the use of porous beryllia as the porous ceramic material.

4. In a discharge tube according to claim 2, the use of porous alumina as the porous ceramic material.

5. In a discharge chamber for a flowing gas channel laser, the improvement of using a porous ceramic material as the side walls of the chamber, wherein the porous ceramic material has an average pore size of about 2 to 20 microns, and wherein the bore of the tubing is about 1 to 3 millimeters in diameter.

* * * * *